United States Patent [19]
Patten et al.

[11] Patent Number: 6,092,409
[45] Date of Patent: Jul. 25, 2000

[54] SYSTEM FOR VALIDATING CALIBRATION OF A CORIOLIS FLOWMETER

[75] Inventors: Andrew T. Patten; Charles Paul Stack, both of Louisville, Colo.

[73] Assignee: Micro Motion, Inc., Boulder, Colo.

[21] Appl. No.: 09/015,737

[22] Filed: Jan. 29, 1998

[51] Int. Cl.[7] .................................................. G01F 25/00
[52] U.S. Cl. ............................ 73/1.34; 73/1.31; 702/100
[58] Field of Search .................... 73/1.34, 1.31; 702/100

[56] References Cited

U.S. PATENT DOCUMENTS

| | | | |
|---|---|---|---|
| Re. 31,450 | 11/1983 | Smith .................................. | 73/861.356 |
| 4,491,025 | 1/1985 | Smith et al. ........................ | 73/861.355 |
| 4,730,501 | 3/1988 | Levien ................................ | 73/861.357 |
| 4,817,448 | 4/1989 | Hargarten et al. .................. | 73/861.356 |
| 4,872,351 | 10/1989 | Ruesch ................................ | 73/861.74 |
| 5,295,084 | 3/1994 | Arunachalam et al. ........ | 73/861.356 X |
| 5,594,180 | 1/1997 | Carpenter et al. .................. | 73/861.356 |
| 5,687,100 | 11/1997 | Buttler et al. ...................... | 73/861.352 |
| 5,734,112 | 3/1998 | Bose et al. .......................... | 73/861.56 |
| 5,736,653 | 4/1998 | Drahm et al. ...................... | 73/861.356 |
| 5,796,012 | 8/1998 | Gomi et al. ........................ | 73/861.359 |
| 5,827,979 | 10/1998 | Schott et al. .................... | 73/861.356 X |
| 5,907,104 | 5/1999 | Cage et al. ......................... | 73/861.355 |

FOREIGN PATENT DOCUMENTS

| | | |
|---|---|---|
| 4413239 | 5/1995 | Germany . |
| 10104040 | 4/1998 | Japan . |
| 10090034 | 10/1998 | Japan . |
| WO88/02853 | 4/1988 | WIPO . |
| 4463 | 5/1989 | WIPO . |

*Primary Examiner*—Thomas P. Noland
*Attorney, Agent, or Firm*—Duft, Graziano & Forest, P.C.

[57] ABSTRACT

A System for validating a flow calibration factor for a Coriolis flow meter. In accordance with the present invention, the period of oscillation of a flow tube is measured as a material of a known density flow through the flow tube. The period of oscillation is used in an equation derived from an equation used to calculate the density of material flowing through the flow tube to find a result. The result is then compared to a result derived from the known density of the material to detect a possible error condition in the flow tube. If an error condition exists an error signal is generated that indicates the Coriolis flow meter should be inspected.

30 Claims, 10 Drawing Sheets

SYSTEM FOR VALIDATING CALIBRATION OF A CORIOLIS FLOWMETER

FIELD OF THE INVENTION

The present invention relates to a system for validating a calibration of a Coriolis flowmeter. More particularly, the present invention relates to measuring the period of oscillation of a flow tube as a material flows through the flow tube to determine if there has been a change in material or cross sectional properties of the flow tube. Still more particularly, the present invention relates to determining when the density of the material calculated from the period of oscillation of the flow tube is not equal to a known density of the material.

PROBLEM

It is known to use Coriolis effect mass flowmeters to measure mass flow and other information of materials flowing through a pipeline as disclosed in U.S. Pat. No. 4,491,025 issued to J. E. Smith, et al. of Jan. 1, 1985 and Re. 31,450 to J. E. Smith of Feb. 11, 1982. These flowmeters have one or more flow tubes of a curved configuration. Each flow tube configuration in a Coriolis mass flowmeter has a set of natural vibration modes, which may be of a simple bending, torsional, radial, or coupled type. Each flow tube is driven to oscillate at resonance in one of these natural modes. The natural vibration modes of the vibrating, material filled systems are defined in part by the combined mass of the flow tubes and the material within the flow tubes. Material flows into the flowmeter from a connected pipeline on the inlet side of the flowmeter. The material is then directed through the flow tube or flow tubes and exits the flowmeter to a pipeline connected on the outlet side.

A driver applies a force to the flow tube. The force causes the flow tube to oscillate. When there is no material flowing through the flowmeter, all points along a flow tube oscillate with an identical phase. As a material begins to flow through the flow tube, Coriolis accelerations cause each point along the flow tube to have a different phase with respect to other points along the flow tube. The phase on the inlet side of the flow tube lags the driver, while the phase on the outlet side leads the driver. Sensors are placed at two different points on the flow tube to produce sinusoidal signals representative of the motion of the flow tube at the two points. A phase difference of the two signals received from the sensors is calculated in units of time.

The phase difference between the two sensor signals is proportional to the mass flow rate of the material flowing through the flow tube or flow tubes. The mass flow rate of the material is determined by multiplying the phase difference by a flow calibration factor. This flow calibration factor is determined by material properties and cross sectional properties of the flow tube. Prior to installation of the flowmeter into a pipeline, the flow calibration factor is determined by a calibration process. In the calibration process, a fluid is passed through the flow tube at a given flow rate and the proportion between the phase difference and the flow rate is calculated.

One advantage of a Coriolis flowmeter is that the accuracy of the measured mass flow rate is not affected by wear of moving components in the flowmeter. The flow rate is determined by multiplying the phase difference between two points on the flow tube and the flow calibration factor. The only input is the sinusoidal signals from the sensors indicating the oscillation of two points on the flow tube. The phase difference is calculated from the sinusoidal signals. There are no moving components in the vibrating flow tube.

The flow calibration factor is proportional to the material and cross sectional properties of the flow tube. Therefore, the measurement of the phase difference and the flow calibration factor are not affected by wear of moving components in the flowmeter.

However, it is a problem that the material and cross sectional properties of a flow tube can change during use of the Coriolis flowmeter. The changes in the material and cross sectional properties of the flow tube are caused by erosion, corrosion, and coating of the flow tube by material flowing through the flow tube. One example of the change in cross-sectional properties of the flow tube is the change in the moment of inertia caused by corrosion of the flow tube. A second example of a change in the material and cross-sectional properties of the flow tube is an increase of the mass of the flow tube and a decrease in cross-sectional areas caused by coating of the flow tube by materials flowing through the tube. A change in the material and cross sectional properties of the flow tube can change the flow calibration factor of the flow tube. If the flow calibration factor of the flowmeter changes, flow rates that are calculated using the original flow calibration factor are inaccurate. Therefore, there is a need in the art for a system that detects a possible change in the material and/or cross sectional properties of a flow tube indicating the mass flow rates measured by the Coriolis flowmeter may be inaccurate.

SOLUTION

The above and other problems are solved and an advance in the art is achieved through the provision of a system for validating the flow calibration factor of a Coriolis flowmeter. In accordance with the present invention, a period of oscillation of a flow tube of the Coriolis flowmeter is measured as a material flows though the flow tube. The measured period of oscillation is then used to detect a possible error condition in the Coriolis flowmeter. If a possible error condition is detected, a signal indicates that the Coriolis flowmeter should be inspected for possible damage.

A Coriolis flowmeter has sensors on the flow tube that are connected to meter electronics. Signals from the sensors are received by the meter electronics and are converted to machine-readable or digital signals. The digital signals are used as data for applications performed by a processor in the meter electronics to determine certain properties, such as mass flow rate and density, of the material flowing through the flow tube. The instructions for these applications are stored in a memory connected to the processor. The present invention relates an application performed by the processor that validates the flow calibration factor of the Coriolis flow meter. The validation application measures a period of oscillation of the flow tube as a material having a known density flows through the flow tube. The measured period of oscillation is then used to detect possible error conditions in the flow tube using derivations of an equation for determining the density of a material from a period of oscillation of the flow tube.

The period of oscillation is used to detect possible error conditions in the flow tube because of the relationship between the flow calibration factor of a flow tube and the measured density of a material flowing through the flow tube. The flow calibration factor (FCF) is equal to a first geometric constant ($G_1$) multiplied by Young's modulus of elasticity for the flow tube ($E_0$) and by the moment of inertia ($I_0$) of the flow tube. The density of a material flowing through a flow tube is calculated by multiplying the square of the period of oscillation of the flow tube ($P^2$) as the material flows through the tube by a first density constant ($C_1$) and then adding a second density constant ($C_2$) to the result. The first density constant (C ) is determined by multiplying a second geometric constant ($G_2$) by Young's modulus of elasticity for the flow tube ($E_0$) and by the moment of inertia of the flow tube ($I_0$). Since the first geometric constant of the flow calibration factor and the second geometric constant of density are both multiplied by Young's modulus of elasticity for the flow tube and by the moment of inertia of the flow tube, the flow calibration factor and the first density constant are proportional.

A change in the first density constant ($C_1$) is typically not attributed to a change in the second geometric constant ($G_2$) which changes very little as the material and/or cross sectional properties of the flow tube change. Therefore, a change in the first density constant ($C_1$) is usually caused by a change in Young's modulus ($E_0$) or the moment of inertia in the flow tube ($I_0$). Since Young's modulus ($E_0$) and the moment of inertia ($I_0$) are also used to calculate the flow calibration factor (FCF), it can be assumed that a change in the first density constant ($C_1$) indicates a change in a flow calibration factor (FCF).

A change in the first density constant ($C_1$) can be detected from the measured density of a material. If the measured density of the material is inaccurate, the first and second density constants ($C_1$ and $C_2$) used to calculate the density must also be inaccurate. Since a period of oscillation of the flow tube as a material flows through the flow tube (P) is used to calculate the density of the material flowing through the flow tube, it is possible to use the period of oscillation (P) to detect a change in the first density constant ($C_1$) which in turn indicates a probable change in the flow calibration factor (FCF).

The following four exemplary embodiments of the present invention detect an error condition indicated by the measured period of oscillation of the flow tube. A first and a second exemplary embodiment use a density of a material calculated from a measured period of oscillation of the flow tube to detect an error condition. A third exemplary embodiment uses the first density constant to detect an error condition. A fourth exemplary embodiment detects an error condition from a comparison of a measured period of oscillation of the flow tube and a known period of oscillation of the flow tube for a given material.

The first exemplary embodiment detects an error condition in the following manner. A period of oscillation of the flow tube is measured as a material with a known density flows through the flow tube. The density of the material is calculated from the measured period of oscillation. The calculated and known densities of the material are compared. If the calculated density is not equal to the known density, a signal indicates an error condition has occurred because the flow calibration factor may have changed and inspection of the Coriolis flowmeter is required. If the calculated and known densities are equal, the measured mass flow rate is accurate and the Coriolis flowmeter does not have to be inspected.

The second alternative exemplary embodiment of the present invention allows for a tolerance in the comparison of the calculated and known densities of the material in the following manner. After a density of a material is calculated, the known density is subtracted from the calculated density to calculate a deviation of the calculated density. The deviation is then compared to a range of tolerance. If the deviation is outside the range of tolerance, a signal indicates an error condition has occurred because the flow calibration factor may have changed and inspection of the Coriolis flowmeter is required. If the deviation is within the range of tolerance, the measured mass flow rate is accurate and the Coriolis flowmeter does not have to be inspected.

The measuring of the period of oscillation and calculation of the deviation can be performed at periodic intervals. The deviation calculated at each interval can be stored for future use. One such future use of the stored calculated deviations is control charting the deviations. From the control charting of the deviations, the lower and upper limits of the tolerance range can be determined.

The third alternative exemplary embodiment of the present invention detects an error condition in the Coriolis flowmeter from the first density constant in the following manner. A first density constant is calculated by a calibration prior to use of the third embodiment to detect error conditions. In the calibration, a first period of oscillation of the flow tube is measured as a first reference material having a first known density flows through the flow tube and a second period of oscillation is measured as a second reference material having a second known density flows through the tube. The first and second periods of oscillation are then squared. The first squared period of oscillation is subtracted from the second squared period of oscillation to determine a change in the squared periods of oscillation. The first known density is subtracted from the second known density to determine a change in densities. The change in densities is then divided by the change in the periods of oscillation squared to determine the first density constant. The first density constant, first known density, and the first squared period of oscillation are stored in memory for use in comparisons of subsequent tests.

In order to detect an error condition, the third exemplary embodiment tests the first density constant in the following manner. A third period of oscillation of the flow tube is measured as a third fluid with a third known density flows through the flow tube. The measured third period of oscillation is squared. The squared period of oscillation of either a first or second material flowing through the flow tube is subtracted from the third squared period of oscillation to determine the change in the squared periods of oscillation. The choice of the reference material used is determined by which material would provide the greatest change in the period of oscillation. The known density of the reference material is subtracted from the third known density to determine the change in densities. The change in densities is then divided by the change in squared periods of oscillation to determine a new first density constant. The new first density constant is compared to the stored first density constant. If the new first density constant is not equal to the stored first density constant, a signal indicates an error condition has occurred because the flow calibration factor may have changed and inspection of the Coriolis flowmeter is required. If the new first density constant and the stored first density constant are equal, the measured mass flow rate is accurate and the Coriolis flowmeter does not have to be inspected.

In the above exemplary embodiments, the density of the material flowing through the flow tube is known because a material, such as air or water, having a density that is well known or that can be found in a table of known densities is used. However, the known density of the material can also be determined by flowing the material through a densimeter in-line with the Coriolis flowmeter to determine the known density of the material flowing through the flow tube.

In the fourth embodiment, an expected period of oscillation and a measured period of oscillation of the flow tube as a material flows through the tube are compared to detect a possible error condition. The expected period of oscillation is determined from calculations using a known density of the material or from prior measurements of the period of oscillation. The period of oscillation of the flow tube is measured as the material flows through the flow tube. The measured period of oscillation is compared to the expected period of oscillation. If the measured and expected periods of oscillation of the material are not equal, a signal indicates an error condition has occurred because the flow calibration factor may have changed and inspection of the Coriolis flowmeter is required. If the measured and known periods of oscillation are equal, the measured mass flow rate is accurate and the Coriolis flowmeter does not have to be inspected.

These and other advantages of the present invention will be apparent from the drawings and a reading of the detailed description thereof.

Figure 1:
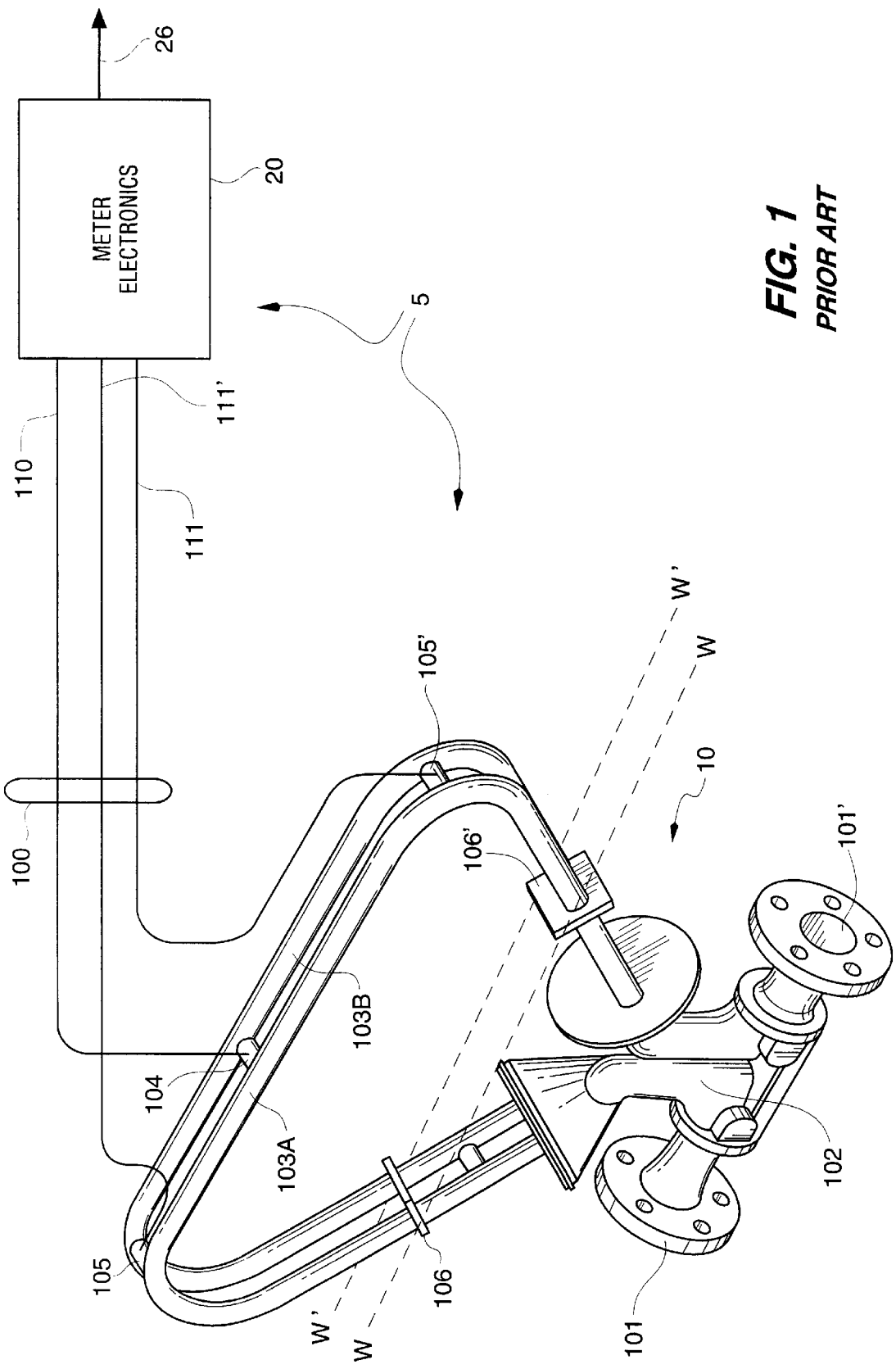
FIG. 1 is a Coriolis flow meter common in the prior art.

DETAILED DESCRIPTION
Coriolis Flowmeter in General—FIG. 1

FIG. 1 illustrates a Coriolis flowmeter 5 comprising a flowmeter assembly 10 and meter electronics 20. Meter electronics 20 is connected to meter assembly 10 via leads 100 to provide density, mass flow rate, volume flow rate, totalized mass flow and other information over path 26. It should be apparent to those skilled in the art that the present invention can be used by any type of Coriolis flowmeter regardless of the number of drivers or the number of pick-off sensors.

Flowmeter assembly 10 includes a pair of flanges 101 and 101', manifold 102 and flow tubes 103A and 103B. Connected to flow tubes 103 A and 103 B are driver 104 and pick-off sensors 105 and 105'. Brace bars 106 and 106' serve to define the axes W and W' about which each flow tube 103A and 103B oscillates.

When flowmeter assembly 10 is inserted into a pipeline system (not shown) which carries the material being measured, material enters flowmeter assembly 10 through flange 101, passes through manifold 102 where the material is directed to enter flow tubes 103A and 103B, flows through flow tubes 103 A and 103B and back into manifold 102 where it exits meter assembly 10 through flange 101'.

Flow tubes 103A and 103B are selected and appropriately mounted to manifold 102 so as to have substantially the same mass distribution, moments of inertia, and elastic modules about bending axes W—W and W'—W' respectively. The flow tubes extend outwardly from the manifold in an essentially parallel fashion.

Flow tubes 103A–B are driven by driver 104 in opposite directions about their respective bending axes W and W' and at what is termed the first out of bending fold of the flowmeter. Driver 104 may comprise one of many well known arrangements, such as a magnet mounted to flow tube 103A and an opposing coil mounted to flow tube 103B. An alternating current is passed through the opposing coil to cause both tubes to oscillate. A suitable drive signal is applied by meter electronics 20, via lead 110 to driver 104. The description of FIG. 1 is provided merely as an example of the operation of a Coriolis flowmeter and is not intended to limit the teaching of the present invention.

Meter electronics 20 receives the right and left velocity signals appearing on leads 111 and 111', respectively. Meter electronics 20 produces the drive signal on lead 110 which causes driver 104 to oscillate flow tubes 103A and 103B. The present invention as described herein, can produce multiple drive signals from multiple drivers. Meter electronics 20 process left and right velocity signals to compute mass flow rate and provide the validation system of the present invention. Path 26 provides an input and an output means that allows meter electronics 20 to interface with an operator.

Figure 2:
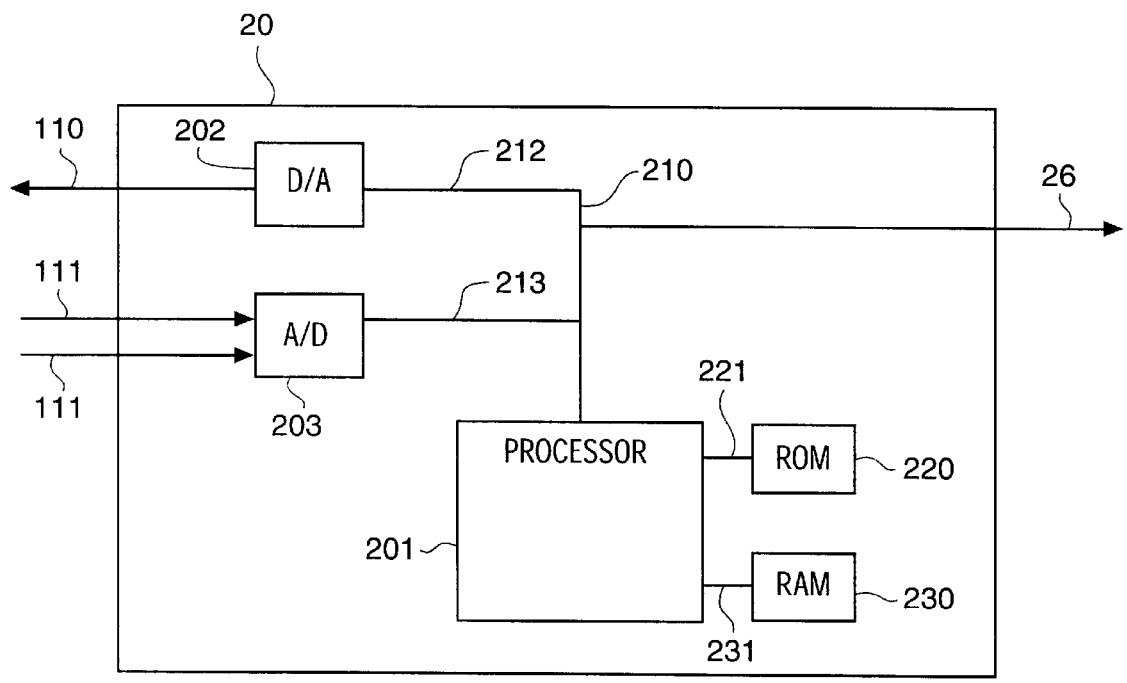
FIG. 2 is a block diagram of the meter electronics in the Coriolis flowmeter.

Meter Electronics 20 in General—FIG. 2

FIG. 2 illustrates a block diagram of the components of meter electronics 20 which perform the processes related to the present invention. Paths 111 and 111' transmit the left and right velocity signals from flowmeter assembly 10 to meter electronics 20. The velocity signals are received by analog to digital (A/D) convertor 203 in meter electronic 20. A/D convertor 203 converts the left and right velocity signals to digital signals usable by processor 201 and transmits the digital signals over path 213 to I/O bus 210. The digital signals are carried by I/O bus 210 to processor 201. Driver signals are transmitted over I/O bus 210 to path 212 which applies the signals to digital to analog (D/A) convertor 202. The analog signals from D/A convertor 202 are transmitted to driver 104 via path 110. Path 26 is connected to I/O bus 210 and carries signals to input and output means (not shown) which allow meter electronics 20 to receive data from and convey data to an operator.

Processor 201 reads instructions for performing the various functions of the flowmeter including but not limited to computing mass flow rate of a material, computing volume flow rate of a material, and computing density of a material from a Read Only Memory (ROM) 220 via path 221. The data as well as instructions for performing the various functions are stored in a Random Access Memory (RAM) 230. Processor 201 performs read and write operations in RAM memory 230 via path 231.

The Relationship between Density and Flow Calibration Factor

The present invention relates to a process for validating the flow calibration factor of Coriolis flowmeter assembly 10 that takes advantage of a proportional relationship between the flow calibration factor of flowmeter assembly 10 and a density of a fluid measured by the oscillation of flow tube 103A–B while the material is flowing through flow tube 103A–B. The proportional relationship is based upon the elements in the equation for finding the flow calibration factor and in the equation for calculating of the density of a material from the period of oscillation of a flow tube 103A–B. The flow calibration factor ("FCF") is equal to a first geometric constant multiplied by the Young's modulus ($E_o$) of the flow tube and the moment of inertia ($I_o$) of the flow tube as shown in Equation 1:

$$FCF = G_1 * E_o * I_o. \quad (1)$$

The density of a fluid flowing through a flow tube is determined by Equation 2:

$$\rho_{material} = (C_1 * P^2) + C_2. \quad (2)$$

Where:
$\rho_{material}$=density of the material;
$C_1$=a first density constant;
$P^2$=the square of the period of oscillation of the flow tube; and
$C_2$=a second density constant determined by the density of the flow tube, the cross section area of flow tube 103A–B, and the cross sectional flow path through flow tube 103A–B.

First density constant $C_1$ is determined by Equation 3:

$$C_1 = G_2 * E_o * I_o. \quad (3)$$

Where:
$G_2$=a second geometric constant determined by the material and cross sectional properties of flow tube;
$E_o$=Young's Modulous of Elasticity; and
$I_o$=Moment of Inertia of the flow tube.

From Equation 1 and Equation 3, it is apparent that $C_1$ and FCF are proportional as shown in Equation 4:

$$FCF/C_1 = G_1 * E_o * I_o / G_2 * E_o * I_o = G_1/G_2. \quad (4)$$

Under normal conditions, it can be assumed that as material and cross sectional properties of flow tube 103A–B change, $G_1$ and $G_2$ remain constant. It can also be assumed that $E_o$ and $I_o$ do not remain constant as the material and/or cross sectional properties of the flow tube 103A/103B change. As a result of $E_o$ and $I_o$ changing, both the flow calibration factor (FCF) and the first density constant ($C_1$) change. This relationship makes it possible to detect of a possible change in FCF or $C_1$ from the change in the other. From Equation 2, it can be seen that a change in the first density constant ($C_1$) will cause an error in a measured density if the original values for the first density constant ($C_1$) and the second density constant ($C_2$) are used to calculate the density. Therefore, it is possible to detect a possible change in the flow calibration factor from the measured density. More specifically, a possible error condition that could change the FCF can be detected from the period of oscillation of the flow tube as material flows through the tube.

Figure 3:
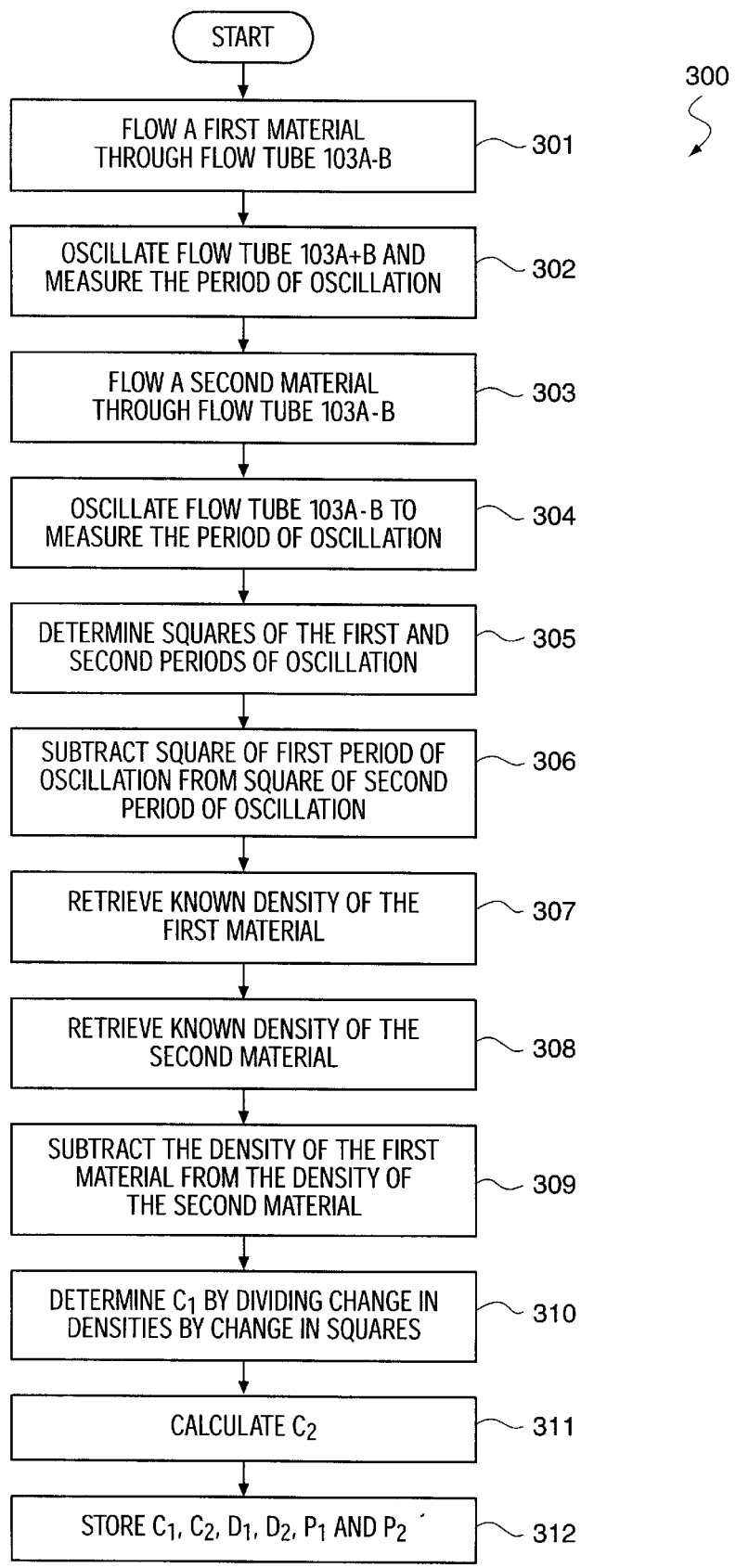
FIG. 3 is a flow chart of a density calibration process for a Coriolis Flowmeter.

Calibration Process for Determining First Density Constant $C_1$ and Second Density Constant $C_2$—FIG. 3

In order to use to Equation (2) for detecting potential error conditions, a density calibration for Coriolis flow meter assembly 10 must be performed to determine a $C_1$ and a $C_2$ to use in calculations of the density of the material flowing through a flow tube 103A–B. Process 300, illustrated in FIG. 3, is a density calibration that is performed to determine $C_1$ and $C_2$ prior to installing Coriolis flow meter assembly 10 into a pipeline. Process 300 begins in step 301 by flowing a first reference material with a known density through flow tube 103A–B In step 302, flow tube 103A–B is oscillated by driver 104 as the first known reference material flow through flow tube 103A–B and the period of oscillation of flow tube 103A–B is measured. In Step 303, a second reference material with a second known density is flowed through flow tube 103A–B. In step 304, driver 104 oscillates flow tube 103A–B while the second reference material flows through flow tube 103A–B and the period of oscillation of flow tube 103A–B is measured. In step 305, the squares of the first and the second measured periods of oscillation are determined. A change in the squares of periods of oscillation is calculated in step 306 by subtracting the square of the first period of oscillation from the square of the second period of oscillation. In steps 307 and 308, the known density of the first reference material and the known density of the second reference material are retrieved from memory 230. The change in densities is determined in step 309 by subtracting the known density of the first reference material from the density of the second reference material. In step 310, $C_1$ is determined by dividing the change in densities by the change in the squares of the periods of oscillation. $C_2$ is calculated in step 311 according to Equation (5):

$$C_2 = ((D_2 - D_1)/(P_2^2 - P_1^2) * P_1^2) - D_1. \quad (5)$$

Where:
$D_1$=density of the first reference material;
$D_2$=density of the second reference material;
$P_1$=the first measured period of oscillation; and
$P_2$=the second measured period of oscillation.

In step 312, the first density constant ($C_1$ the second density constant ($C_2$), the density of the first reference material ($D_1$), the density of the second reference material ($D_2$), the first measured period of oscillation ($P_1$), and the second measured period of oscillation ($P_2$) are stored in memory 230 for use in future calculations.

Figure 4:
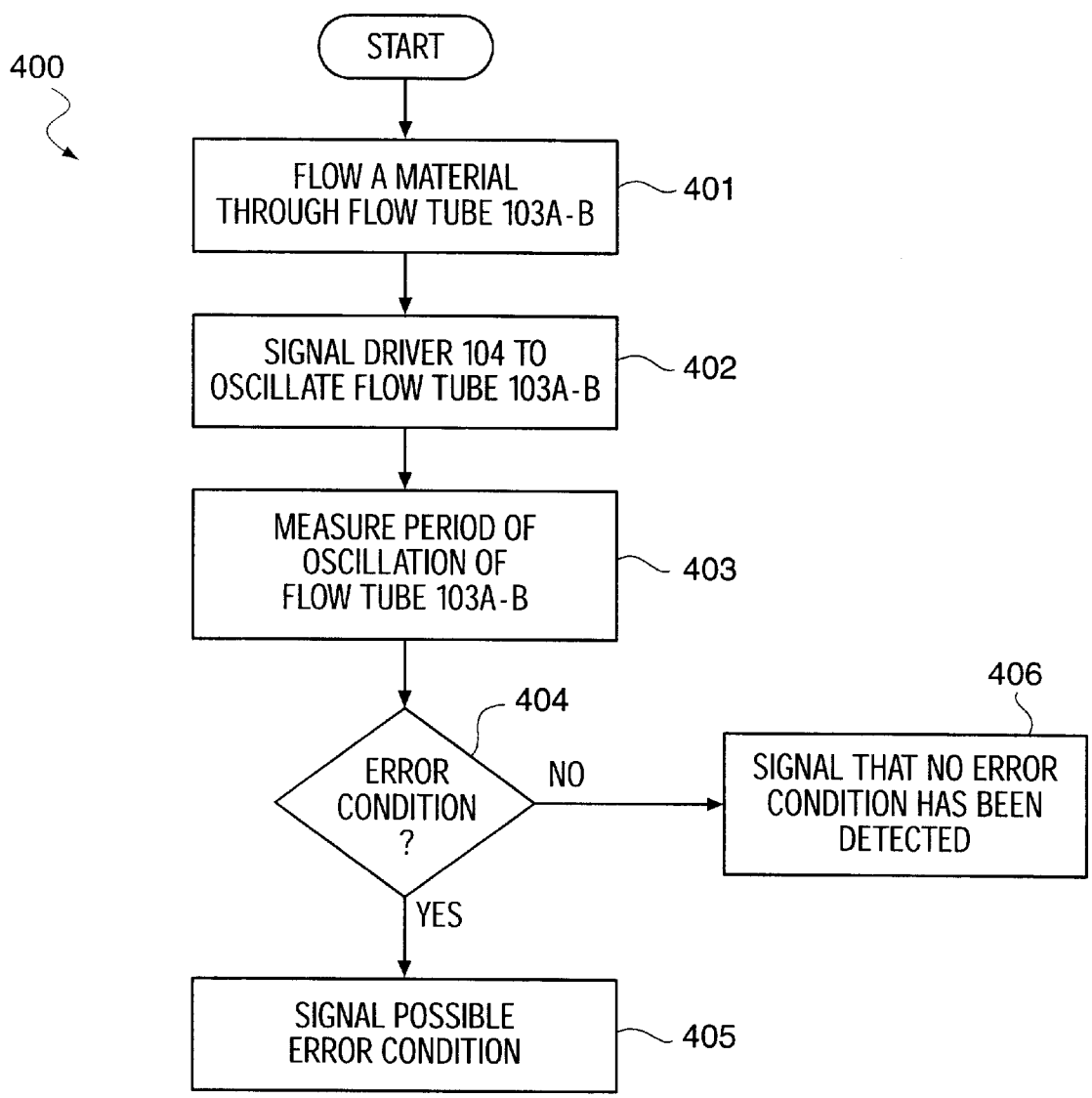
FIG. 4 is a flow chart of a validation process of the present invention.

Process for Validating the Flow Calibration Factor—FIG. 4

FIG. 4 shows a process 400 for validating the flow calibration factor of Coriolis flowmeter assembly 10. Process 400 begins in step 401 by flowing a material of a known density through flow tube 103A–B. In step 402, Processor 201 signals driver 104 to oscillate the flow tube 103A–B as the material flows through flow tube 103A–B. The period of oscillation of the flow tube is measured in step 403. In step 404, an error condition detection process, as described below, is executed to detect a possible error condition in Coriolis flowmeter assembly 10. If an error condition is detected, an error signal is generated in step 405. If no error condition is detected, a signal indicating that no possible error condition is detected is generated in step 406.

Figure 5:
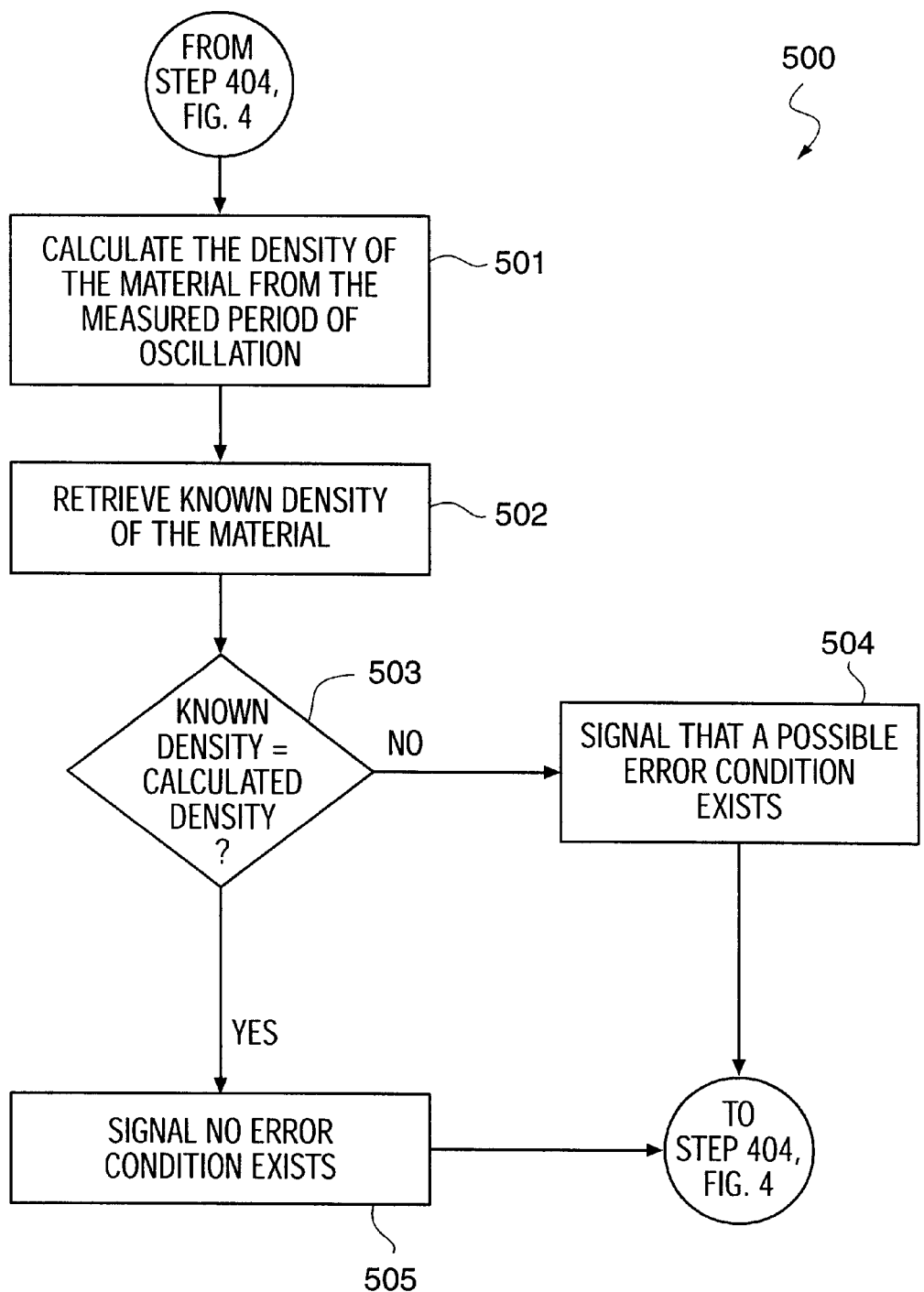
FIG. 5 is a flow chart of a first embodiment of an error condition detection process.

Error Detection Process Using Measured Density—FIG. 5

A first embodiment of an error detection process is illustrated in FIG. 5. Error detection process 500 is a simple comparison between a known density of a material and a calculated density of the material from the period of oscillation. Process 500 begins in step 501 by calculating the density of the material from the measured period of oscillation using a $C_1$ and a $C_2$ that are determined by calibration process 300 described in FIG. 3. In step 502 of FIG. 5, the known density of the material is retrieved from memory 230. In step 503, a comparison of the calculated and known densities is made. If the calculated density is equal to the known density, a signal indicates no error condition is detected in step 505. If the calculated density is not equal to the known density, a signal indicates a possible error condition is detected in step 506. Process 500 returns to step 404 of process 400 after either step 504 or step 505 is executed.

Figure 6:
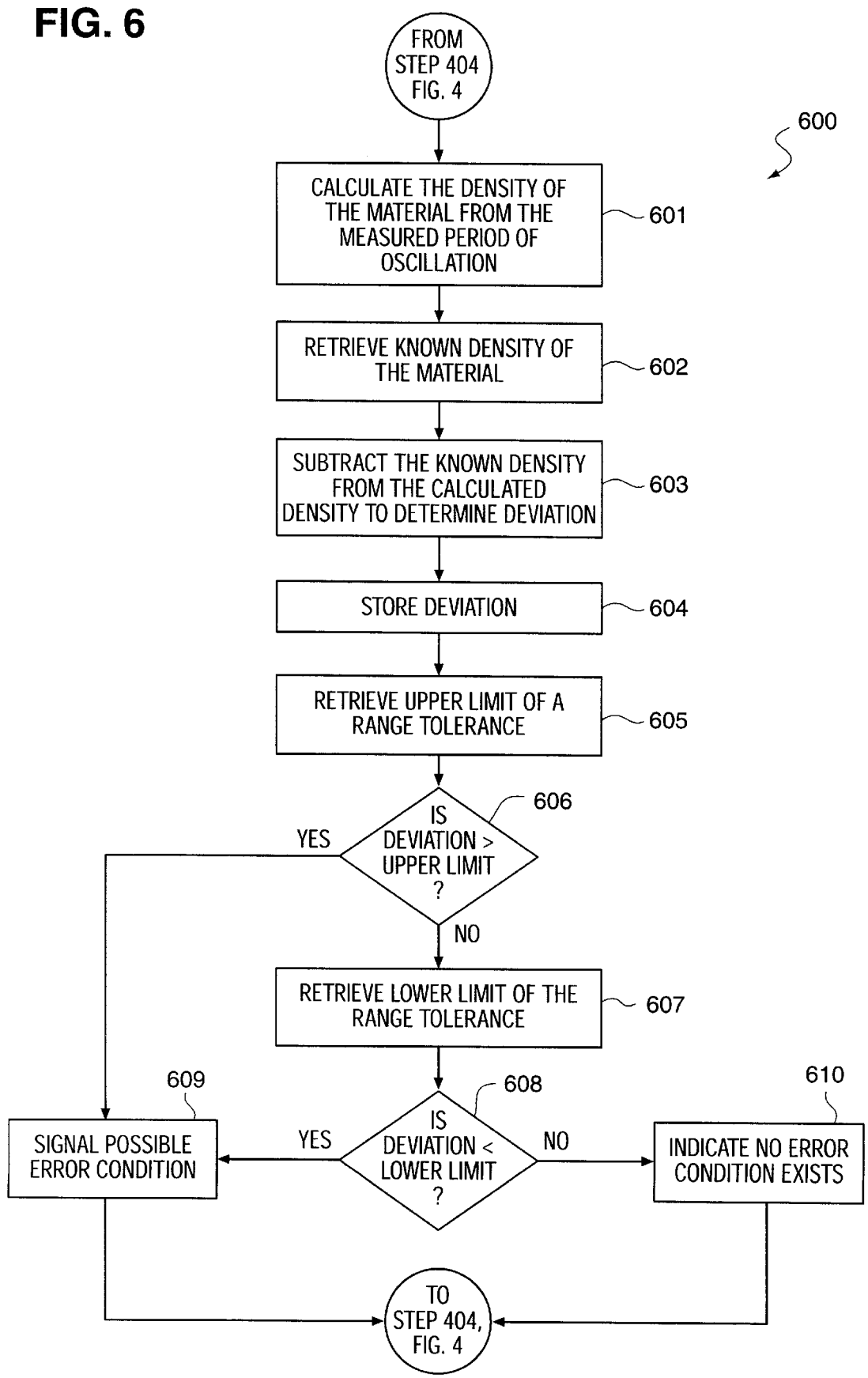
FIG. 6 is a flow chart of a second embodiment of an error condition detection process.

Error Detection Process Using a Deviation from a Known Density—FIG. 6

Figure 12:
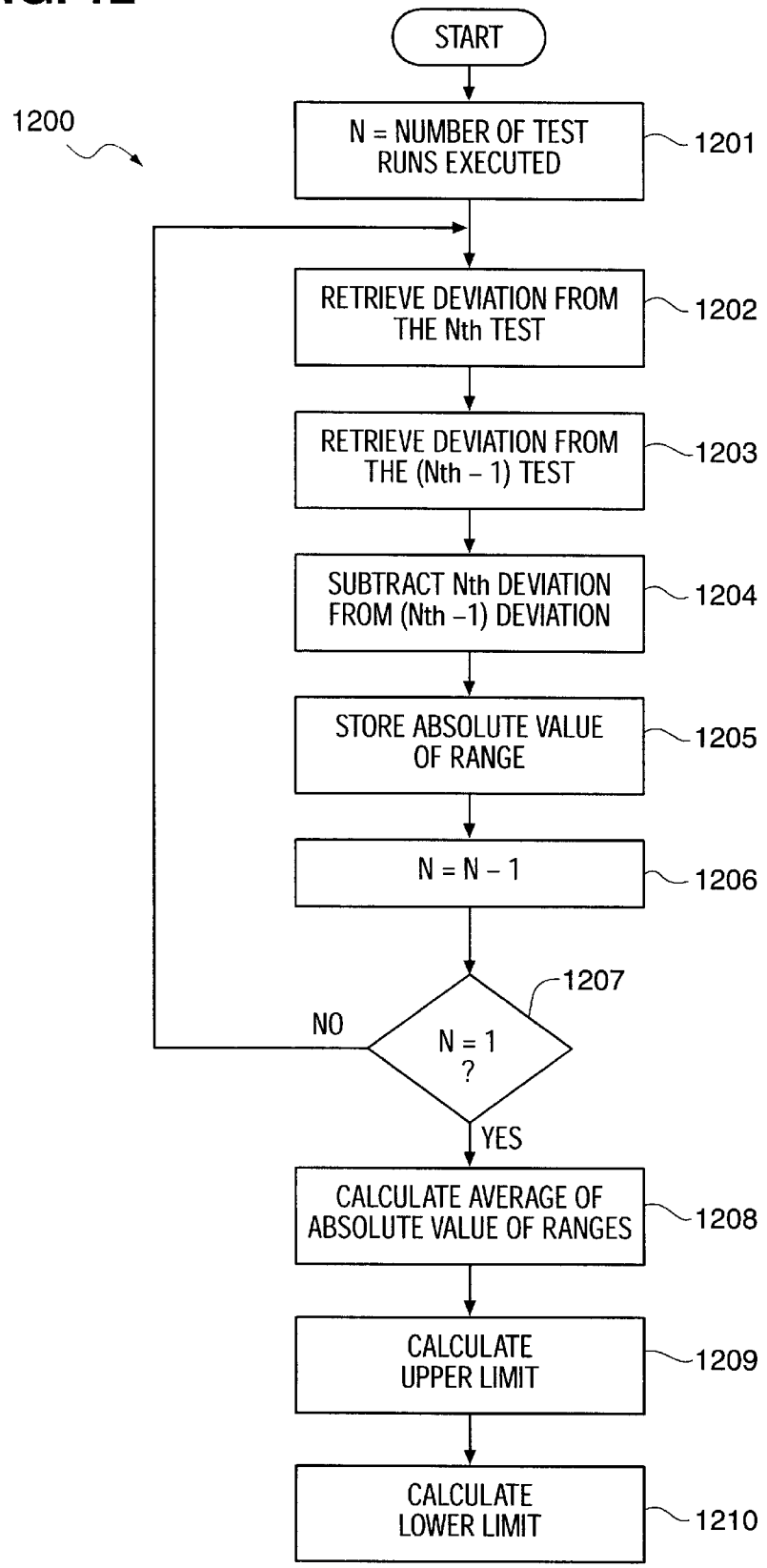
FIG. 12 is a flow chart of a method for finding upper and lower limits for a tolerance range.

A second embodiment of an error detection process is illustrated in FIG. 6. Error detection process 600 provides for an acceptable variation between the measured density of the material flowing through flow tube 103A–B and the known density of the material. The variation is allowed for by determining a deviation between a calculated and a known density and comparing the deviation to a range of acceptable deviation otherwise referred to as a range of tolerance. Process 600 begins in step 601 by calculating the density of the material from the period of oscillation using a $C_1$ and a $C_2$ that are determined by a density calibration process 300 described in FIG. 3. The known density of the material is retrieved from memory 230 in step 602 on FIG. 6. In step 603, the known density of the material is subtracted from the calculated density of the material to determine a deviation. The deviation is stored to memory 203 for future use in step 604. One such future use is control charting the deviations from a plurality of trials to establish the upper and lower limits of the range of tolerance as illustrated in FIG. 12. The upper limit of the range of tolerance is retrieved from memory in step 605. The deviation and the upper limit are compared in step 606 to determine if the deviation is greater than the upper limit. If the deviation is greater than the upper limit, a signal indicates a possible error condition in step 609. If the deviation is less than or equal to the upper limit, a lower limit of the range of tolerance is retrieved from memory 230 in step 607. In step 608 the deviation is compared to the lower limit. If the deviation is less than the lower limit, a signal indicates a possible error condition in step 609. If the deviation is greater than or equal to the lower limit, a signal indicates no error condition in step 610. After step 609 or step 610, process 600 returns to step 404 of process 400 on FIG. 4.

Figure 7:
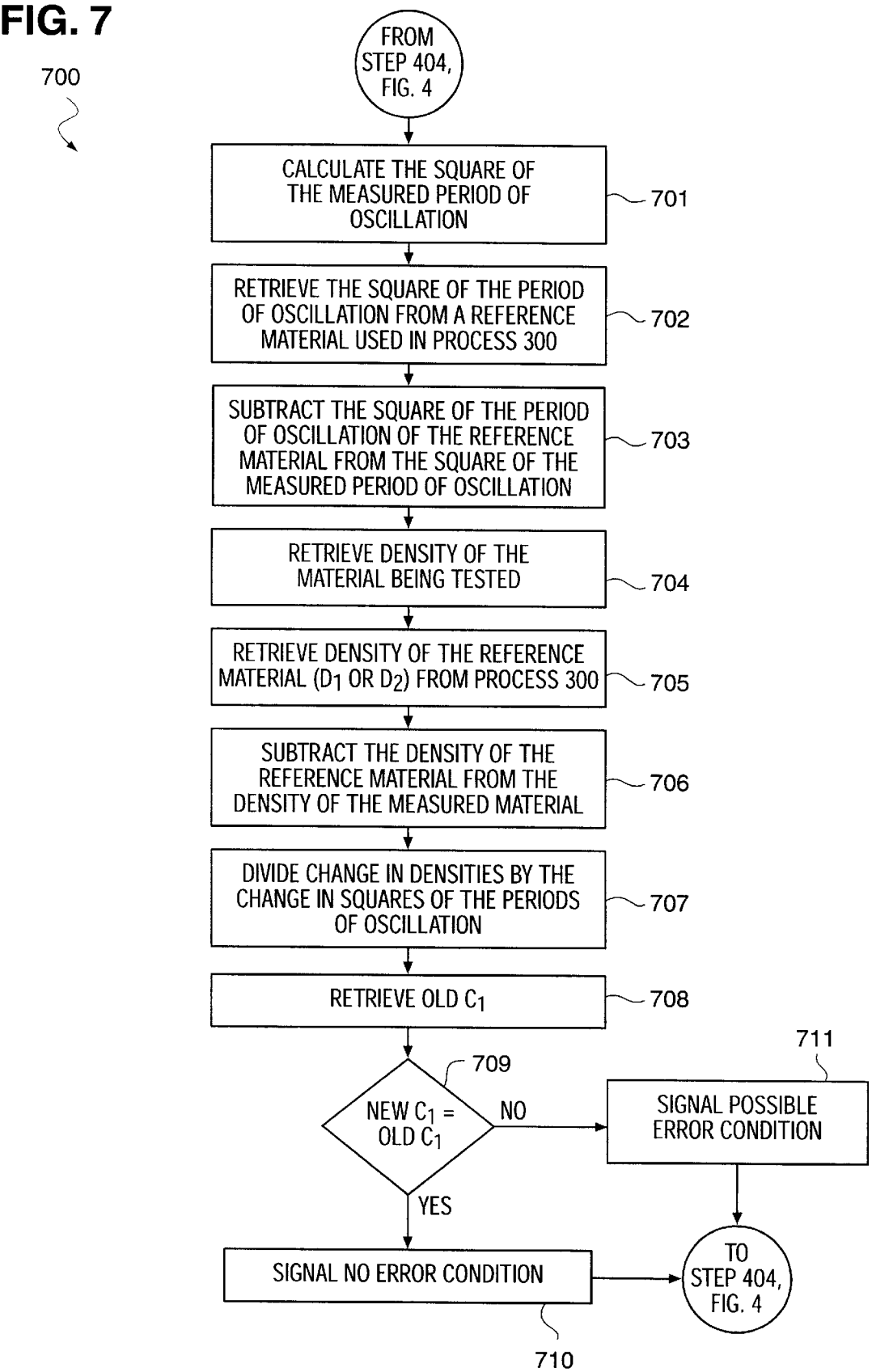
FIG. 7 is a flow chart of a third embodiment of an error condition detection process.

Error Detection Process Using $C_1$—FIG. 7

A third error detection process is illustrated in FIG. 7. Third error detection process 700 detects possible error conditions by determining a new $C_1$ for the flow meter and comparing new $C_1$ and the old $C_1$ determined by the density calibration process 300 illustrated in FIG. 3. For purposes of process 600, it is assumed that the density of the first and second reference material used in calibration process 300 and the period of oscillations of the first and second reference materials do not change. This is not true in a changing system, since the period of oscillation for the first and second materials must change to compensate for the changing $C_1$. Although the calculated new $C_1$ is an approximation, the result of process 600 is still reliable for error detection purposes because a change in $C_1$ is detected even if the precise calculation of the new $C_1$ is inaccurate.

In FIG. 7, process 700 begins with step 701 by calculating the square of the period of oscillation measured in step 403 of FIG. 4. The square of period of oscillation for one of the reference materials in calibration process 300 is retrieved from memory 230 in step 702. The reference material used is the reference material that has a period of oscillation that has the greatest deviation from the measured period of oscillation. A change in the squares of the periods of oscillation is calculated in step 703 by subtracting the square of the period of oscillation of the reference material from the square of measured period of oscillation. The known density of the measured material is retrieved from memory 230 in step 704 and the known density of the reference material from calibration process 300 is retrieved from memory 230 in step 705. A change in densities is calculated in step 706 by subtracting the density of the reference material from the known density of the measured material. A new $C_1$ is calculated in step 707 by dividing the change in densities by the change in the squares of the periods of oscillation. The old $C_1$ is retrieved from memory 230 in step 708 and compared to the new $C_1$. In step 709, the new $C_1$ and the old $C_1$ are compared. If the old $C_1$ is equal to the new $C_1$ a signal in step 710 indicates that no error condition is detected. If the old $C_1$ is not equal to the new $C_1$, a signal in step 711 indicates that a possible error condition is detected. After step 710 or 711 are executed, process 700 returns to step 404 of process 400 on FIG. 4.

Figure 8:
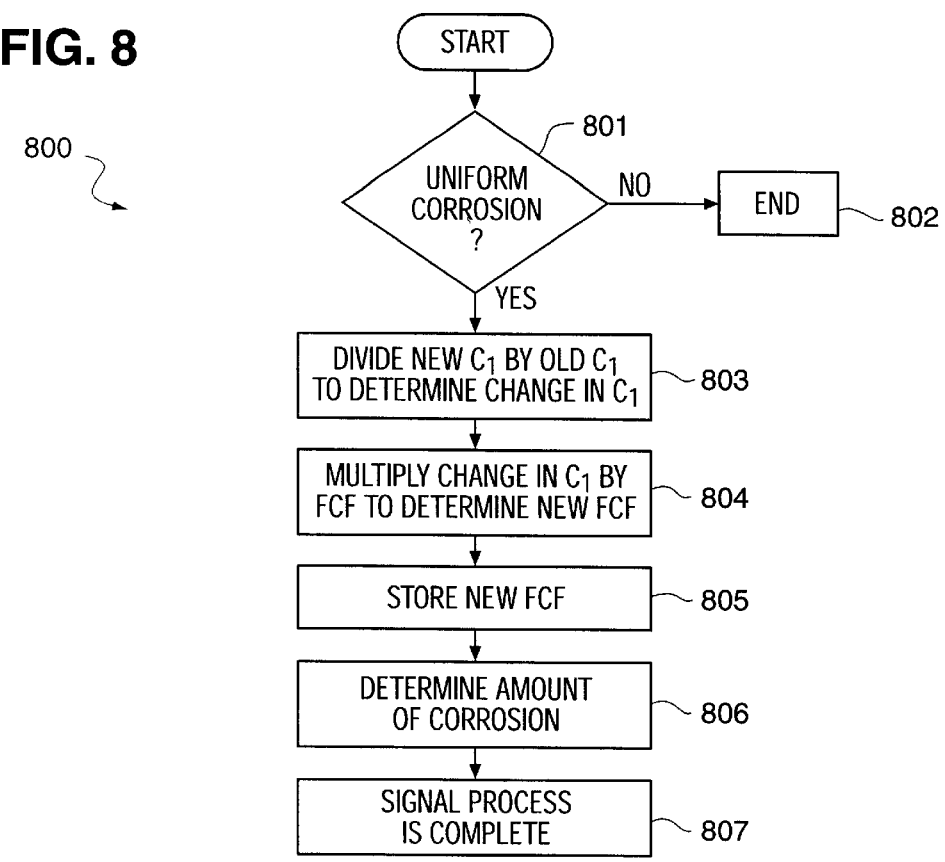
FIG. 8 is a flow chart of a possible error correction process using data from the third embodiment of an error condition detection process.

An Error Correction Process based on $C_1$—FIG. 8.

If uniform corrosion is occurring in Coriolis flowmeter assembly 10, the moment of inertia is changing uniformly. If the moment of inertia is changing uniformly, the proportional change of the first constant of density is approximately equal to the proportion of change to the flow calibration factor. The error correction process of FIG. 8 takes advantage of this relationship to find a new flow calibration factor for the system. Process 800 begins in step 801 with a diagnostic test to detect uniform corrosion of the flow tube at the brace bars. It is assumed that an operator familiar with the physical and chemical properties of the material flowing through flow tube 103A–B can detect this uniform corrosion. If uniform corrosion is not detected, process 800 ends in step 802 which signals the error is not correctable. If uniform corrosion is detected, step 803 divides the new C by the old C to detect the proportion of the change. In step 804, the proportion of the change and the flow calibration factor are multiplied to find a the new flow calibration factor. In step 805, the flow calibration factor is stored for future use.

In step 806, the amount of corrosion of the flow tube is determined. The determination of the amount of corrosion is based upon the following observations of the change in cross sectional properties of the flow tube 103A–B during uniform corrosion. When uniform corrosion of flow tube 103A–B occurs, it is known that the moment of inertia ($I_o$) and cross sectional area of the flow tube change as the flow tube corrodes. However, it can be assumed that only the moment of inertia changes for purposes of corrosion detection. From Equation (3), it is known that $C_1=(G_2 * E_o * I_o)$. It is possible to determine the amount of the moment of inertia for solving for a new $I_o$ in Equation (3). In order to solve for a new $I_o$, $G_2$ must be solved for in Equation (3) using the old $C_1$ and the known original values of $E_o$ and $I_o$. Then the new $I_o$ can be solved for using the new $C_1$, the and the known values of $G_2$ and $E_o$. This is shown in Equation (6):

$$\text{New } I_o = \text{New } C_1/(G_2 * E_o) \tag{6}$$

It is known, that $I_o$ is a function of the cross sectional area of the flow tube as shown in Equation (7).

$$I_o = \pi * (r_o^4 - r_i^4) \tag{7}$$

Where:

$r_o$=the outer radius of flow tube 103A–B; and $r_i$=the inside radius of flow tube 103A–B. Once the new $I_o$ is known it is possible to find the new $r_i$ by manipulating Equation (7) because ro does not change. The old $r_i$ is subtracted from the new r to determine the amount of corrosion in step 806. This can be used to predict the amount of time that the flow tube will be provide mass flow rates with the accuracy required by the process. Process 800 ends in step 807 with a signal indicating the process is completed.

Figure 9:
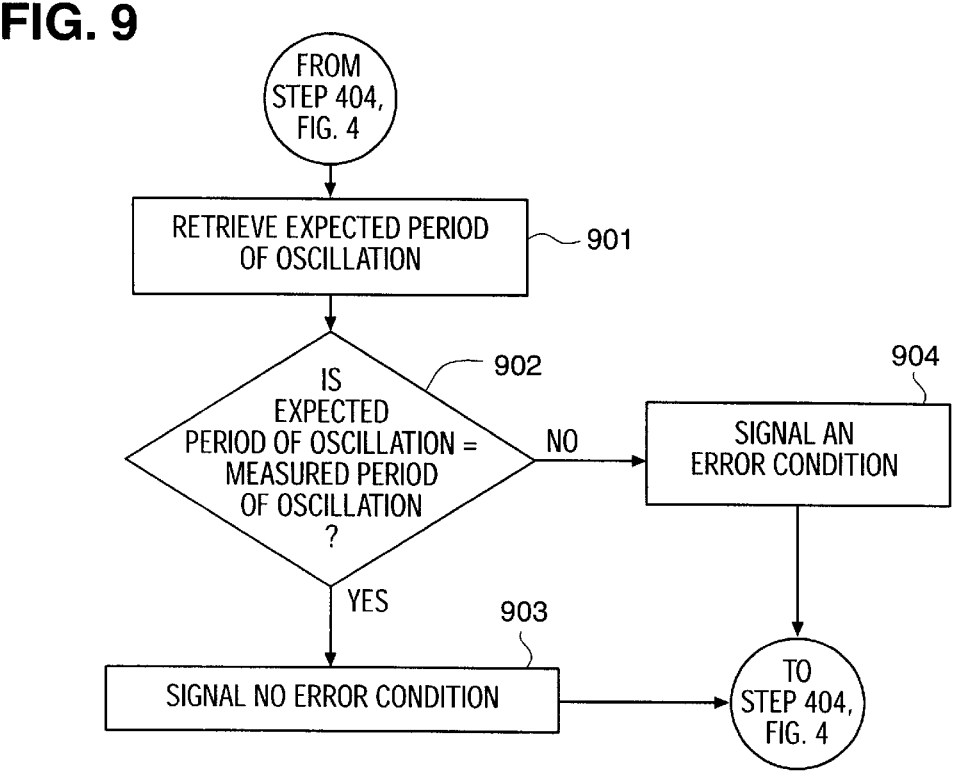
FIG. 9 is a flow chart for a fourth embodiment of an error detection process.

A Fourth Error Detection Process Using the Measured Period of Oscillation—FIG. 9

A fourth error detection process is illustrated in FIG. 9. Fourth error correction process 900 simply compares the measured period of oscillation as a material flows through flow tube 103A–B with an expected period of oscillation for flow tube 103A–B as the material is flowing. This process reduces the number of calculations needed in the process if the expected period of oscillation is known. Process 900 begins in step 901 by retrieving an expected period of oscillation from a memory 230. The expected period of oscillation can be precalculated for a material having a known density, may be determined at the time of the comparison by calculations based on a known density of the material, or may be known from previous measurements of the same material. In step 902, the expected period of oscillation is compared to the measured period of oscillation. If the measured period of oscillation is equal to the expected period of oscillation, a signal in step 903 indicates that no error condition is detected. If the measured period of oscillation is not equal to the expected period of oscillation, a signal in step 904 indicates that a possible error condition is detected. After step 903 or step 904, process 900 returns to step 404 of process 400 on FIG. 4.

Figure 10:
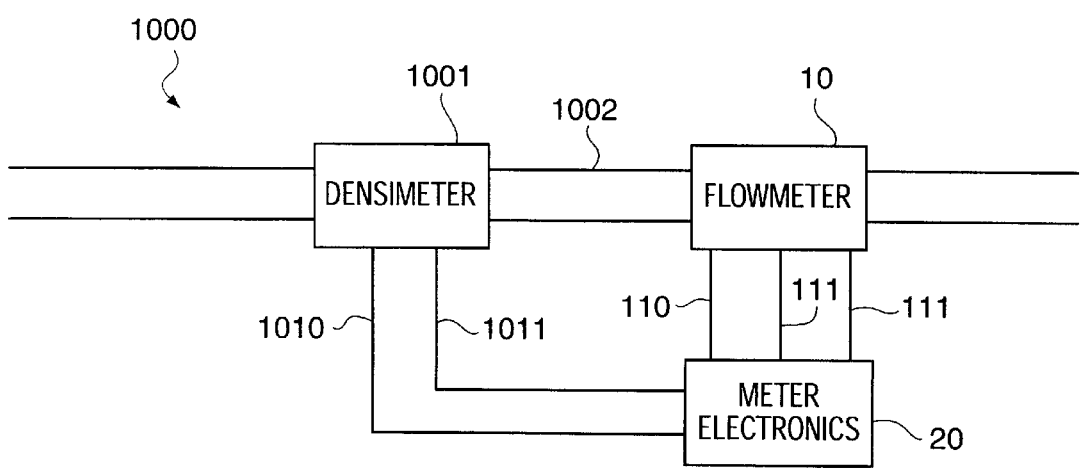
FIG. 10 is a diagram of a system containing a densimeter for determining the density of a material.
Figure 11:
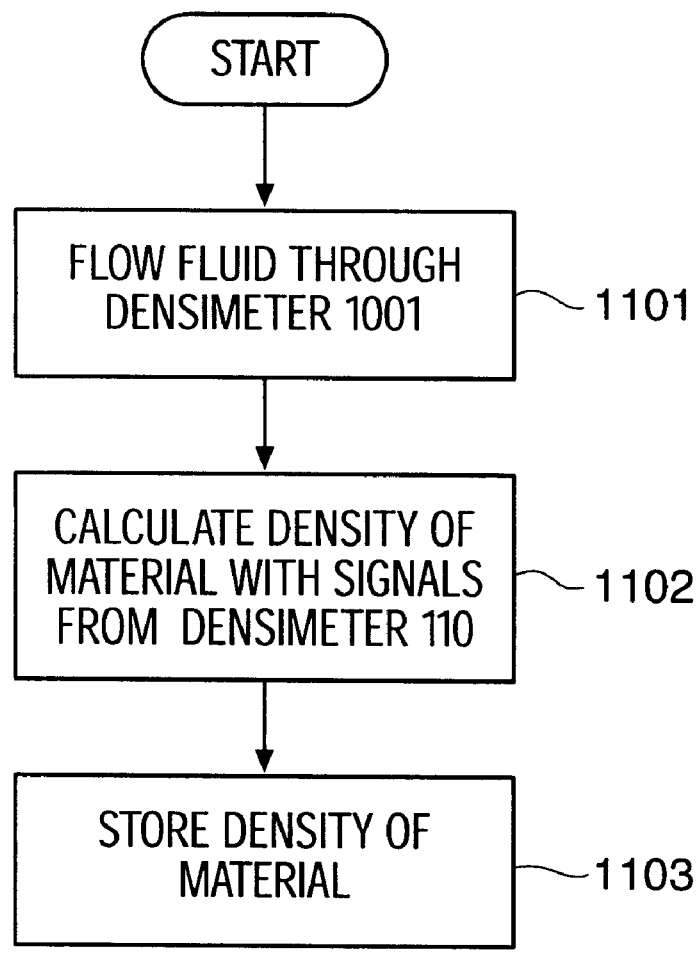
FIG. 11 is a flow chart of determining the density of a material as the material flow though the system.

System and Process for Determining the Known Density of a Material—FIGS. 10 and 11.

FIG. 10 illustrates a diagram of a pipeline 1000 having both a densimeter 1001 and Coriolis flowmeter assembly 10 installed in the pipeline 1002. Densimeter 1001 is a densimeter common in the prior art such as a densimeter produced by Solartron, Inc., and Coriolis flowmeter assembly 10 is a Coriolis flowmeter common in the prior art such as an Elite Coriolis Flowmeter produced by Micro Motion, Inc. In the preferred embodiment, densimeter 1001 is upstream of Coriolis flowmeter assembly 10 as illustrated in FIG. 10. However, it is envisioned that densimeter 1000 may also be slip stream or downstream of Coriolis flowmeter 100. Meter electronics 20, receives signals from densimeter 1001 over paths 1010 and 1011. As illustrated in FIG. 2, meter electronics 20 has circuitry for converting electronic signals from densimeter 1001 received from densimeter 1001 via paths 1010 and 1011 into machine readable. Meter electronics 20 can then determine the density according to instructions stored in ROM 220.

The process for determining the density from the system in FIG. 10 is illustrated in FIG. 11. Process 1100 begins in step 1101 by receiving the signals from densimeter 1001 in meter electronics 20. The density of the material is determined from the signals in step 1102. The calculated density is then stored in memory 230 in step 1103. The density is then used in any of the error detection process as the known density of the material flowing through flow tube 103A–B.

Flow Charting of Results to provide a Range of Acceptable Deviation—FIG. 12

The calculations of the upper and lower limits of a tolerance range through control charting are taught in FIG. 12. It is understood that although the control charting in FIG. 12 is applied to the deviations computed in n number of test using process 600 in FIG. 6 that the method of control charting could be applied to the other embodiments of the present invention as well as process 600. Control chart process 1200 begins in step 1201 which sets a counter n to the number of deviations resulting from process 500 that are stored in memory. An iterative process begins in step 1202 which retrieves the deviation from the nth test. Step 1203 retrieves the deviation for the nth−1 test. The nth−1 deviation is subtracted from the nth deviation to determine a range between the deviations and the absolute value of the range is determined in step 1204. The absolute value of the range is stored in step 1205. In step 1206, n is decremented by one. N is then tested in step 1207 to determine if n=1. If n is not equal to 1, steps 1202–1207 are repeated using the new n. If n is equal to 1, the average of all the absolute values of the ranges is calculated in step 1208. The upper limit is calculated and stored in step 1209. The upper limit is calculated by multiplying the average of the absolute value of the range by 2.66. Process 1200 ends in step 1210 by calculating and storing the lower limit of the tolerance range. The lower limit is calculated by multiplying the average of the absolute value of the ranges by 2.66 and subtracting from zero.

Conclusion

This invention is a validation system that signals potential errors in the flow calibration factor of a Coriolis flowmeter. In most tests of a Coriolis flowmeter, no error will be detected. However, the test does verify that the mass flow rate and other measurement are accurate. This invention only detects the possibility of an error condition in the flowmeter and the flowmeter must be inspected to detect any damage to the flowmeter.

While specific embodiments of this invention have been disclosed above, it is expected that those skilled in the art can and will design alternative embodiments of this invention that fall within the scopes of the following claims either literally or through the Doctrine of Equivalents.

What is claimed is:

1. A system for validating a mass flow calibration of a Coriolis flowmeter comprising:

means for flowing a material through a flow tube of said Coriolis flowmeter;

means for oscillating said flow tube as said material flows through said flow tube;

means for measuring a period of oscillation of said flow tube as said material flows through said flow tube;

means responsive to measuring of said period of oscillation for detecting a calibration error condition; and means responsive to a detection of said calibration error condition for signaling said calibration error condition exists.

2. The system of claim 1 wherein said material flowing through said flow tube has a known density and said means for detecting said calibration error condition comprises:

means responsive to measuring of said period of oscillation for computing a calculated density for said material;

means for comparing said calculated density of said material to said known density of said material; and means responsive to said calculated density not being equal to said known density for determining said calibration error condition exists.

3. The system of claim 1 wherein said material flowing through said flow tube has a known density and said means for detecting said calibration error condition comprises:

means for computing a calculated density of said material from said period of oscillation of said flow tube;

means for calculating a deviation of said calculated density from said known density;

means for comparing said deviation to an acceptable tolerance range; and means for determining said calibration error condition exists responsive to said deviation being outside of said acceptable tolerance range.

4. The system of claim 3 wherein said validating of said mass flow calibration of said Coriolis flowmeter is performed at periodic intervals and said system further comprises:

means for storing said deviation calculated for each validation of said mass flow calibration performed;

means responsive to storing said deviation of each validation for determining an upper limit of said tolerance range for said deviation of each said validation of said mass flow calibration performed; and means responsive to storing said deviation of each validation for determining a lower limit of said tolerance range for said deviation of each said validation of said mass flow calibration performed.

5. The system of claim 1 wherein said means for detecting said calibration error condition comprises:

means for measuring the density of said material flowing through said flow tube;

means for determining a calculated density of said material from said period of oscillation of said flow tube;

means for comparing said calculated density of said material and said measured density of said material; and means for determining a calibration error condition exists responsive to said calculated density of said material not being equal to said measured density of said material.

6. The system of claim 1 wherein a first density constant for calculating a density of a material flowing through said flow tube squared is known and said means for detecting said calibration error condition comprises:

means for calculating a new first density constant from said measured period of oscillation for said material;

means for comparing said first density constant to said known first density constant; and means responsive to said new first density constant not being equal to said known first density constant for determining said calibration error condition exists.

7. The system of claim 6 wherein said means for determining said new first density constant comprises:

means for calculating a square of said measured period of oscillation of said flow tube;

means for subtracting a known square of period of oscillation of said flow tube for a reference material having a known density from said square of said measured period of oscillation to determine a first result;

means for subtracting said known density of said reference material from said known density of said material flowing through said flow tube to determine a second result; and means for dividing said second result by said first result to determine said second slope to determine said new first density constant.

8. The system of claim 7 further comprising:

means for measuring the density of said material flowing through said flow tube.

9. The system of claim 7 wherein the density of said material is known.

10. The system of claim 6 further comprising:

means responsive to a detection of said calibration error condition for detecting uniform corrosion in said flow tube.

11. The system of claim 10 further comprising:

means responsive to determining of said uniform corrosion in said flow tube for dividing said new first density constant by said known first density constant to determine a result;

means responsive to determining said second result for multiplying a Flow Calibration Factor of said flow tube by said result to determine a new Flow Calibration Factor to be used in a determination of mass flow rates in said Coriolis flowmeter.

12. The system of claim 10 further comprising:

means responsive to a detection of uniform corrosion for determining the amount of uniform corrosion.

13. The system of claim 1 wherein said means for detecting said calibrationerror condition comprises:

means for comparing said measured period of oscillation of said material to an expected period of oscillation for said material; and means for determining said calibration error condition exists responsive to said measured period of oscillation for said material not being equal to said expected period of oscillation of said material.

14. The system of claim 13 further comprising:

means for determining said expected period of oscillation for said material from the density of said material.

15. The system of claim 14 further comprising:

means for determining the density of said material flowing through said flow tube.

16. A method for validating a mass flow calibration of a Coriolis flowmeter comprising the steps of:

flowing a material through a flow tube of said Coriolis flowmeter;

oscillating said flow tube as said material flows through said flow tube;

measuring a period of oscillation of said flow tube as said material flows through said flow tube;

detecting a calibration error condition responsive to measuring said period of oscillation; and signaling said calibration error condition exists responsive to a detection of said calibration error condition.

17. The method of claim 16 wherein said material flowing through said flow tube has a known density and said step for detecting said calibration error condition comprises the steps of:

computing a calculated density for said material responsive to said period of oscillation;

comparing said calculated density of said material to said known density of said material; and determining said calibration error condition exists responsive to said calculated density not being equal to said known density.

18. The method of claim 16 wherein said material flowing through said flow tube has a known density and said step for detecting said calibration error condition comprises the steps of:

computing a calculated density of said material from said period of oscillation of said flow tube;

calculating a deviation of said calculated density from said known density;

comparing said deviation to an acceptable tolerance range; and determining said calibration error condition exists responsive to said deviation being outside of said acceptable tolerance range.

19. The method of claim 18 wherein said method validating said mass flow calibration factor of said Coriolis flowmeter is performed at periodic intervals and said system further comprises:

storing said deviation calculated for each validation of said mass flow calibration performed;

determining an upper limit of said tolerance range on said deviation of each said validation of said mass flow calibration performed responsive to storing said deviation of each validation; and determining a lower limit of said tolerance range for said deviation of each said validation of said mass flow calibration performed responsive to storing said deviation of each validation.

20. The method of claim 16 wherein said step for detecting said calibration error condition comprises the steps of:

measuring the density of said material flowing through said flow tube;

determining a calculated density of said material from said period of oscillation of said flow tube;

comparing said calculated density of said material and said measured density of said material; and determining a calibration error condition exists responsive to said calculated density of said material not being equal to said measured density of said material.

21. The method of claim 16 wherein a first density constant for calculating a density of a material flowing through said flow tube squared is known and said step for detecting said calibration error condition comprises the steps of:

calculating a new first density constant from said measured period of oscillation for said material;

comparing said new first density constant to said known first density constant; and determining said calibration error condition exists responsive to said new first density constant not being equal to said known first density constant.

22. The method of claim 21 wherein said step for determining said new first density constant comprises the steps of:

calculating a square of said measured period of oscillation of said flow tube;

subtracting a known square of period of oscillation of said flow tube for a reference material having a known density from said square of said measured period of oscillation to determine a first result;

subtracting said known density of said reference material from said known density of said material flowing through said flow tube to determine a second result; and dividing said second result by said first result to determine said second slope to determine said new first density constant.

23. The method of claim 22 further comprising the steps of:

measuring the density of said material flowing through said flow tube.

24. The method of claim 22 wherein the density of said material is known.

25. The method of claim 21 further comprising the step of:

detecting uniform corrosion in said flow tube responsive to said calibration error condition being detected.

26. The method of claim 25 further comprising the steps of:

dividing said new first density constant by said known first density constant to determine a result responsive to a detection of said uniform corrosion in said flow tube;

multiplying a Flow Calibration Factor of said flow tube by said result to determine a new Flow Calibration Factor to be used in a determination of mass flow rates in said Coriolis flowmeter responsive to determining said second result.

27. The method of claim 25 further comprising the steps of:

determining the amount of corrosion of said flow tube responsive to a detection of corrosion.

28. The method of claim 16 wherein said step for detecting said calibration error condition comprises steps of:

comparing said measured period of oscillation of said material to an expected period of oscillation for said material; and determining said calibration error condition exists responsive to said measured period of oscillation for said material not being equal to said expected period of oscillation of said material.

29. The method of claim 28 further comprising the step of:

determining said expected period of oscillation for said material from the density of said material.

30. The method of claim 29 further comprising step of:

determining the density of said material flowing through said flow tube.

* * * * *